United States Patent [19]

Puri

[11] Patent Number: 4,482,174
[45] Date of Patent: Nov. 13, 1984

[54] APPARATUS AND METHOD FOR MAKING A TUBE CONNECTION

[75] Inventor: Vijay K. Puri, Chatsworth, Calif.

[73] Assignee: Lokring, Los Angeles, Calif.

[21] Appl. No.: 187,438

[22] Filed: Sep. 15, 1980

[51] Int. Cl.$^3$ .............................................. F16L 13/14
[52] U.S. Cl. ................................. 285/382.2; 285/417; 29/508; 29/520
[58] Field of Search .................. 285/382.2, 417, 382.7; 29/508, 520, 521

[56] References Cited

U.S. PATENT DOCUMENTS

| | | | |
|---|---|---|---|
| 1,532,886 | 4/1925 | Cowles | 285/382.2 X |
| 2,553,981 | 5/1951 | Richardson | 285/382.7 X |
| 3,827,727 | 8/1964 | Moebius | 285/382.2 X |
| 3,893,720 | 7/1975 | Moebius | 285/382.2 X |
| 4,061,367 | 12/1977 | Moebius | 285/382.2 |

Primary Examiner—Dave W. Arola
Attorney, Agent, or Firm—Lyon & Lyon

[57] ABSTRACT

An apparatus comprising a sleeve having a first end, a second end, and a center portion; and a lockring slidable on at least the first end. The second end could be the mirror image of the first end or could be any fitting desired to be attached to a tube section. The first end has a constant radius annular chamber such that the end of a tube section slides easily therein initially. The exterior of the first end of the sleeve has a "REVERSE TAPER" configuration such that the exterior radius of the sleeve is least near the center portion and increases generally outward therefrom to a maximum near the end of the sleeve. When the lockring is forced onto the exterior of the sleeve, the sleeve and tube section are deformed the least amount near the center portion, the amount of deformation than generally increasing outward therefrom to a maximum near the end of the sleeve. In the preferred embodiment, this reverse taper is accomplished by a single exterior rib having an inclined surface running therefrom toward the center portion. In another embodiment, the reverse taper is accomplished by a plurality of externally projecting ribs, the first rib near the end of the sleeve being of the greatest radius, and each successive rib toward the center of the apparatus being of successively smaller radius.

14 Claims, 10 Drawing Figures

APPARATUS AND METHOD FOR MAKING A TUBE CONNECTION

BACKGROUND OF THE INVENTION

The present invention is related to apparatus for making a tube connection. More specifically, it is an extension and improvement upon the inventions disclosed in U.S. Pat. Nos. 3,827,727 and 4,061,367.

In products which utilize tubing, whether copper, steel, aluminum or other malleable metal, many of the connections are of a permanent nature. At one time, a majority of these connections were made by welding, soldering or brazing the ends of tubing sections together. This was time consuming and costly. The first improvement in the connection of such tubing sections was the flareless fitting. This provided more rapid connection, but did not provide sufficient strength and performance necessary for a great many applications. Further, the cost and weight of the flareless fitting proved a substantial drawback.

It is the simultaneous accomplishment of these three goals of low cost, light weight, and high performance which has proved elusive in the design and construction of a permanent connecting device. An innovation in tube connection technology, and the technology upon which this invention is an improvement, is described in U.S. Pat. Nos. 3,827,727; 3,893,720; 4,026,006; and 4,061,367. These patents relate to various designs of sleeve and lockring assemblies which cause deformation and intimate contact between the sleeve and tube section to create a permanent, high performance sealing contact. Nevertheless, the demand for higher performance, lighter weight, and decreased cost has required that the present technology still be improved upon. The present invention provides such an improvement.

SUMMARY OF INVENTION

The present invention is related to an apparatus for forming a tube connection. The apparatus has a first end comprising a sleeve into which a tube section is initially slidable, and onto which a lockring is forceable; a center portion to stop the movement of the tube and of the lockring; and a second end which may be another sleeve, mirroring the first end, or a plug, an elbow, a reducer or any other fitting or shape which is desired to be permanently attached to the end of a tube section. The sleeve is uniquely shaped to provide, after the tube section is inserted and the lockring forced into place, a reverse taper deformation of the outer sleeve and tube section. "REVERSE TAPER" refers to the deformation being least near the center portion of the apparatus and thereafter generally increasing toward the outer end of the sleeve. This manner of deformation greatly reduces the required installation force while it greatly increases the pullout strength of the tube connection thereby formed. In comparison, this invention reduces the installation forces by as much as fifty per cent (50%) over similar connections, (as described in U.S. Pat. No. 4,026,006), and produces a connection with twice the pull-out strength for a similar size and weight device. Alternatively, utilizing the apparatus of the present invention, the same pull-out strength may be obtained with approximate one-half the size and weight of previous connection apparatus. These savings in size and weight are extremely desirable not only as a reduction in unit cost, but also as a reduction in overall weight of the aircraft or other vehicle in which a vast number of such tube connection apparatus are used. In addition, this manner of deformation causes the tube section to distend slightly thereby creating a preloaded tube connection in which the end of the tube section is forced tightly against the center portion of the device; or, in one embodiment, against an opposing tube section.

It is the object of this invention to provide an improved apparatus for making a tube connection, which tube connection will display greater pull-out strength, easier installation, lighter weight, and less cost. Other and additional objects will become apparent upon a reading of the entire specification, drawings and claims.

DETAILED DESCRIPTION OF THE PREFERRED EMBODIMENT

Figure 1:
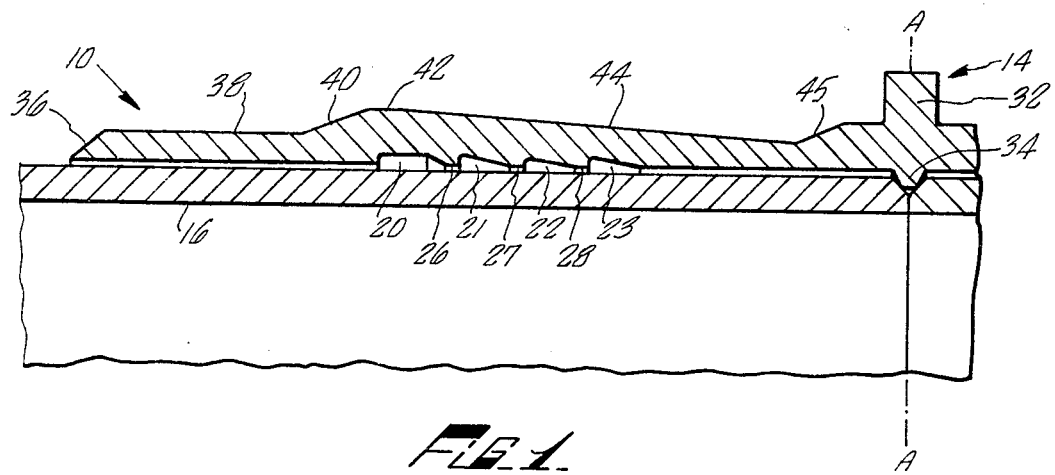
FIG. 1 is a side view in cross section of the preferred embodiment of the sleeve of the instant invention. A tube section is also shown inserted into the sleeve.

The present invention is preferably embodied in a device for forming a tube joint between two separate tube sections of equal size. The apparatus, then, is broadly symmetrical about centerline A—A. The description, therefore, will be predominantly directed to one end of the apparatus, with reference being made to the components of the second end only when necessary to describe some feature of the invention. It is to be understood, however, that the inventive features contained herein are not restricted to use in a device for connecting two tube sections in a line, but may be used to make a variety of tube joints and connections. The second end of the apparatus could comprise a plug, a reducer, an elbow, a tee, etc.

The apparatus of the present invention consists of a sleeve, generally designated 10, a lockring, generally designated 12, and a center portion generally designated 14. The sleeve may be constructed of any malleable metal, such as aluminum, steel, copper, etc.; whereas the lockring is constructed of a metal of considerably higher strength. Sleeve 10 has a hollow interior to allow tube section 16 to slide initially therein. Around the periphery of its hollow interior, sleeve 10 may have sawtooth grooves 20, 21, 22 and 23. These sawtooth grooves are of sufficient size and shape to allow the tube section 16, upon forcing the lockring 12 into position over the exterior of sleeve 10, to be deformed by the "teeth" of said sawtooth grooves while the tube diameter is unaffected within the grooves to provide a gripping action of the outer sleeve 10 upon tube 16.

As shown in FIG. 1 the preferred embodiment includes four grooves. The leading groove 20 is substantially equi-diametral to present a sufficiently large surface for easy inspection by micrometer measurement. That diameter is equal to the diameters of grooves 21, 22 and 23 at their greatest point. Therefore, inspection of leading groove 20 will insure proper depth of grooves 21, 22 and 23. Between the grooves are flat lands 26, 27 and 28. The lands 26, 27 and 28 contact and deform the tube section 16 when the lockring 12 is forced onto sleeve 10.

Figures 8, 9:
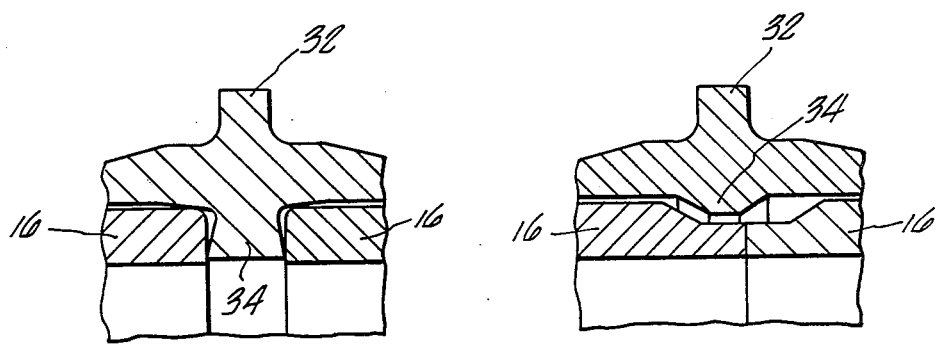
FIG. 8 is a side view in cross-section showing one embodiment of the center portion.
FIG. 9 is a similar view of an alternate embodiment of the center portion.

At center portion 14 of sleeve 10 is an externally extending stop flange 32 which limits the movement of the lockring 12 onto outer sleeve 10 and an internally extending positioning flange 34 which limits the insertion of tube 16 into sleeve 10 so as to properly center the separate tube sections within sleeve 10 to ensure maximum strength of connection. Two embodiments of positioning flange 34 are shown. In the first embodiment, positioning flange 34 extends radially inward a distance roughly equal the size of the tube wall of tube section 16. This embodiment is shown in FIG. 8. In this embodiment, the tube section ends abut directly against positioning flange 34 and do not come into direct contact with one another. In the alternative embodiment shown in FIG. 9, positioning flange 34 extends a lesser distance radially inward. Using this embodiment of the positioning flange 34, the ends of tube sections 16 may be beveled or shaped so as to allow a substantial portion of the ends of tube sections 16 to come into contact with one another. It should also be noted that the positioning flange 34 could be omitted entirely, allowing the invention to be used for repairing leaks in the tube section.

The exterior portion of sleeve 10 has a slight "reverse taper" running from the surface 42 of the sleeve 10 to the center portion 14. In the preferred embodiment, as shown in FIG. 1, this "reverse taper" is achieved by a configuration wherein the exterior diameter of sleeve 10 is uniform for a distance from outer end 36 toward center portion 14 to create a flat surface 38. The exterior diameter of sleeve 10 then increases sharply to create inclined surface 40. In the preferred embodiment, this incline is at a 20° slope. At its greatest point, the exterior diameter is again uniform to create a second flat surface 42. Thereafter, the exterior diameter of sleeve 10 gently decreases, preferrably at approximately a 3° slope, to create a second inclined surface 44. Flat surface 42 and inclined surface 44 create the "REVERSE TAPER" effect unique to this invention. Leading from inclined surface 44 to stop flange 32 is inclined surface 45 to aid the movement of lockring 12 into position at stop flange 32. Immediately adjacent to stop flange 32 is plateau 47 upon which the front of lockring 12 finally rests when lockring 12 is thrust into its final position on sleeve 10.

Figure 3:
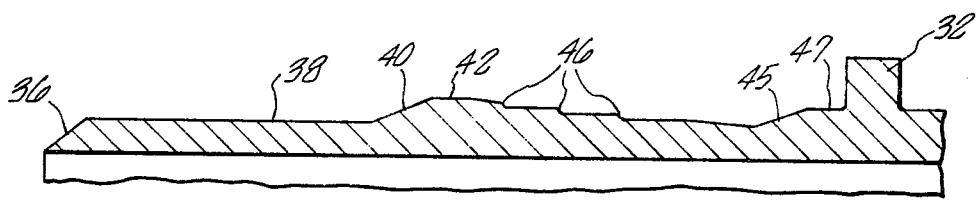
FIG. 3 is an alternate embodiment of the sleeve, also shown as a side view in cross section.

In an alternate embodiment, as shown in FIG. 3, the inclined surface 44 is fitted with steps 46 which tend to hold the lockring 12 in position.

Figure 4:
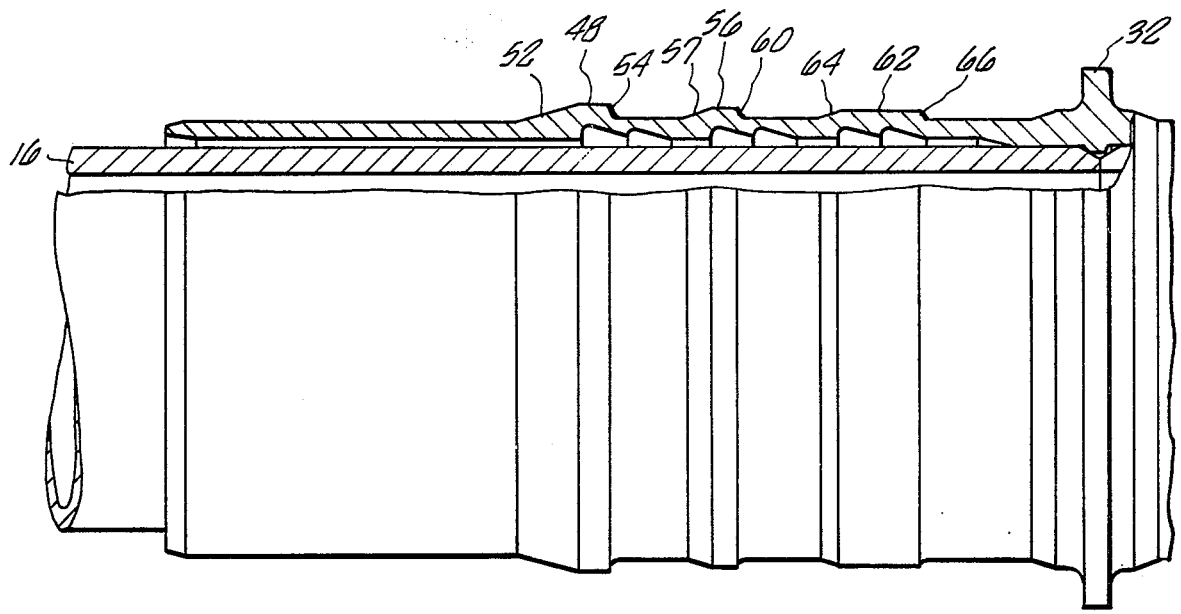
FIG. 4 is a side view of the sleeve, with tube inserted. A portion is cut away to show the sleeve and tube in cross-section.
Figure 5:
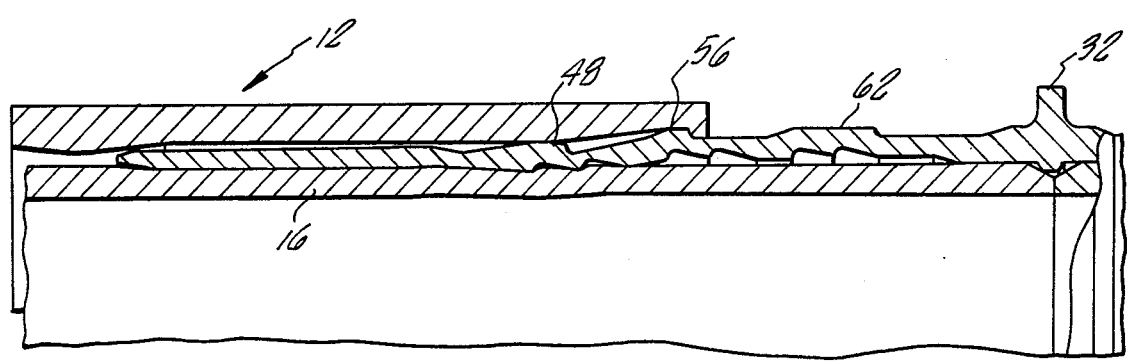
FIG. 5 is a similar view, showing the incidence of the lockring onto the sleeve and the resultant deformation of the sleeve and tube.
Figure 6:
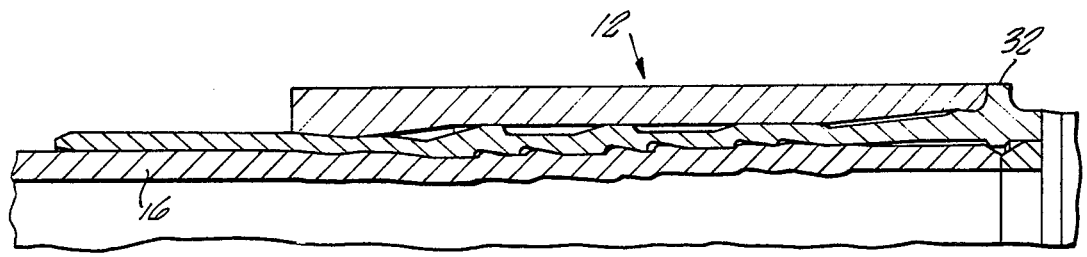
FIG. 6 is a similar view, showing the lockring in final position and the final deformation of the sleeve and tube.
Figure 7:
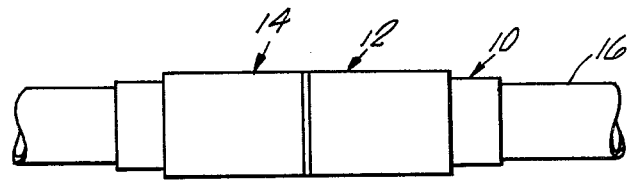
FIG. 7 is a plan view of the completed tube connection as formed by the preferred embodiment of the present invention.

In another embodiment, as shown in FIG. 4, the "REVERSE TAPER" is accomplished by a series of externally projecting ribs. First rib 48 is the first rib which lockring 12 encounters as lockring 12 is forced into position toward stop flange 32 on sleeve 10. Rib 48 has inclined surface 52 on the side of rib 48 which faces the onslaught of lockring 12. This is to facilitate the movement of lockring 12 over rib 48. On the opposite side of rib 48 from inclined surface 52, is an abrupt shoulder 54. The abrupt shoulder 10 restrains movement of the lockring 12 after lockring 12 has been forced onto sleeve 10. Sleeve 10 has a second external rib 56, which like rib 48, extends about the total periphery of periphery of sleeve 10, and is located between rib 48 and stop flange 32. Second rib 56 has a similar incline surface 57 to aid the motion of lockring 12 and an abrupt shoulder 60. The external radius of second rib 56 is slightly but significantly less than the similar dimension of first external rib 48. Sleeve 10 has a third external rib 62, located between second external rib 56 and stop flange 32. Like external ribs 48 and 56, rib 42 has an inclined surface 64 and an abrupt shoulder 66. The external radius of third rib 62 is slightly but significantly less than the similar dimension of second rib 56. The amount by which the external radii of ribs 48, 56 and 62 successively decrease is such as to produce the approximately 3° "REVERSE TAPER."

Figure 10:
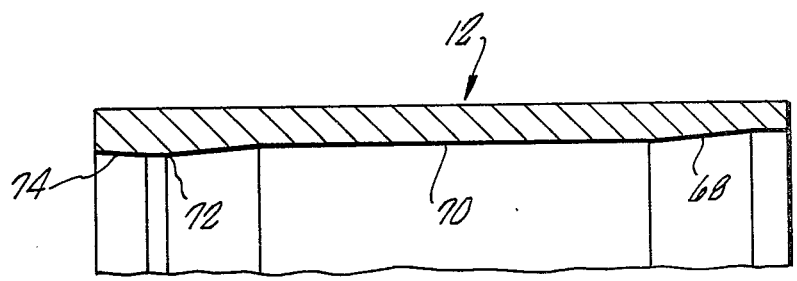
FIG. 10 is a side view in cross-section of an alternate embodiment of the lockring.

Turning now to lockring 12, it will be seen that lockring 12 is broadly a frustum in longitudinal cross-section. Front beveled edge 68 aids lockring 12 as it encounters inclined surface 40, (or ribs 48, 56, and 62), and plateau 47. Following beveled edge 68 is flat area 70. Flat area 70 is located such that it is positioned over substantially the total exterior surface of surfaces 40, 42 and 44, (or ribs 48, 56 and 62) when locking 12 is forced into final position against stop flange 32. Lockring 12 has an abrupt shoulder 72 which aids in maintaining lockring 12 in position. In one embodiment of lockring 12, shown in FIG. 10, a trailing surface 74 is included to eliminate a potential stress point at abrupt shoulder 72.

A tube connection is formed by sliding tube section 16 into sleeve 10. The tube section 16 is initially easily slidable within sleeve 10, however, the size of sleeve 10 is such as to eliminate much of the free space between tube section 16 and the interior surface of outer sleeve 10 without restricting the free slidability of tube section 16 within sleeve 10. Positioning flange 34 restricts the movement of tube section 16 within sleeve 10 and causes the tube end 16 to be centrally located within sleeve 10. Lockring 12 is then forced over sleeve 10, causing sleeve 10, and concomitantly therewith, tube section 16, to deform. Because of the configuration of the sleeve 10, the sleeve and the tube section 16 are deformed to the greatest extent at surface 42, (or rib 48). They are deformed a lesser amount nearer center portion 14. This produces a reverse taper in the deformation of sleeve 10 and tube section 16. As the tube 16 is deformed, it is forced into sawtooth grooves 20, 21, 22 and 23. Sawtooth grooves 18 then provide a gripping function tending to hold tube section 16 within sleeve 10.

By deforming tube section 10 in this manner, tube section 16 undergoes a "toothpaste tube" effect, whereby tube section 16 is slightly but significantly distended. As the opposing tube section 16 is likewise distended, the adjoining tube sections 16 are forced, under a substantial load, into intimate contact with positioning flange 34 or with one another, depending upon the embodiment of positioning flange 34 being utilized. In either embodiment, a crevice free joint is obtained which substantially eliminates cleaning and corrosion problems.

Figure 2:
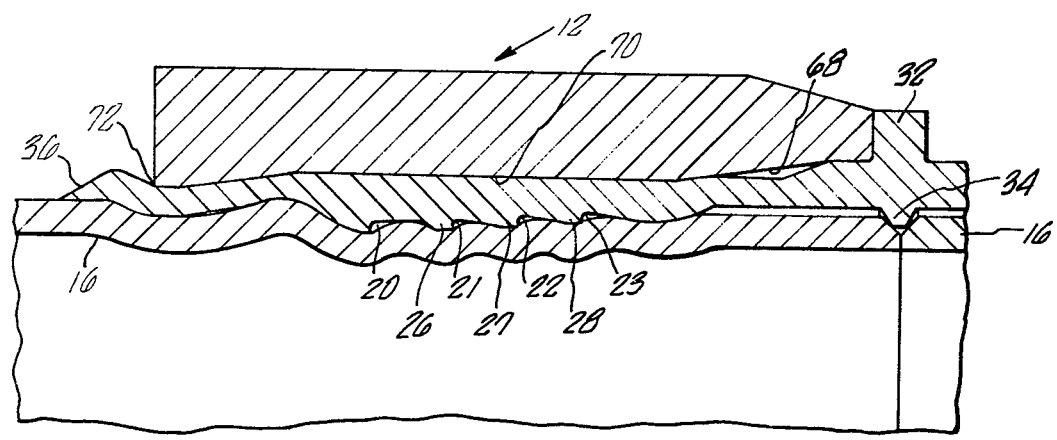
FIG. 2 is a side view showing the lockring, sleeve and tube, in cross section, after the lockring has caused deformation of the sleeve and tube.

A line connecting the interior edges of the sawtooth grooves of the deformed sleeve, and a line connecting the same grooves prior to deformation, form an angle, designated B in FIG. 2, of approximately 3 degrees. As can readily be seen, in order for tube section 16 to be withdrawn from sleeve 10 once lockring 12 has been forced into position thereby deforming sleeve 10 and tube 16, that amount of tube 16 between surface 40 (or first rib 48) and positioning flange 32 would need to be further deformed. This 3 degree "REVERSE TAPER" significantly increases the pullout strength of the tube connection formed by this invention.

Thus, an improved apparatus for making a tube connec-tion has been described and disclosed. It will, however, be clear to those skilled in the art that many modifications of the embodiment here described are possible. Therefore, the invention is not to be limited except by the spirit and scope of the appended claims.

What is claimed is:

1. An apparatus for making a tube connection comprising a sleeve having a first end, a center portion and a second end; at least said first end having a substantially constant radius annular chamber adapted to receive a tube section snugly therein and a reverse taper exterior whose exterior radius reduces generally from a maximum near said first end to a lesser amount near said center portion; and lockring means having an interior radius less than the greatest exterior radius of said first end of said sleeve for engaging and deforming the material of said sleeve in the area of said annular chamber, and concomitantly deforming the tube section inserted therein, upon being forced longitudinally along and about the sleeve exterior from said first end to said center portion, such that the resultant deformation of said sleeve, and hence the inserted tube section, will be greatest near said first end of said sleeve and thereafter generally reducing toward said center portion to produce a reverse taper deformation of said sleeve chamber and hence of the tube section inserted therein.

2. The invention of claim 1 wherein said reverse taper exterior comprises a single rib formed about the periphery of said sleeve near said first end, said rib having a leading inclined surface on the side of said rib near said first end of said sleeve and a trailing incline surface on the side of said rib near said center portion of said sleeve.

3. The invention of claim 1 wherein said reverse taper exterior comprises a plurality of externally projecting ribs, the outside radius of successive ribs generally reducing from said first end to said center portion.

4. The invention of claim 1 wherein said sleeve has about its periphery a plurality of ribs, each said rib projecting a distance outward from said sleeve; the exterior radius of each successive rib, from said first end toward said center portion, generally reducing.

5. The invention of claims 2, 3 or 4 wherein a radially outward extending stop flange is attached to said center portion of said sleeve, said stop flange designed and constructed to limit the longitudinal movement of said lockring means on said sleeve.

6. The invention of claims 2, 3, or 4 wherein a radially inward extending positioning flange is attached to said center portion of said sleeve, said positioning flange designed and constructed to limit the longitudinal movement of the tube within said sleeve.

7. The invention of claim 6 wherein said positioning flange extends a distance radially inward broadly equal to the size of the tube wall.

8. The invention of claim 6 wherein said positioning flange extends a distance radially inward broadly less than one-half the size of the tube wall.

9. The invention of claims 2, 3 or 4 wherein at least said first end has a plurality of grooves formed about its internal periphery.

10. The invention of claim 9 wherein said grooves are designed and constructed to allow the tube to plastically deform into said grooves when said lockring is forced longitudinally into position.

11. An apparatus for making a tube connection between an outer sleeve and a tube section inserted therein, said apparatus comprising an outer sleeve having an inner chamber adapted to receive a tube section snugly therein, said outer sleeve having a first externally projecting circumferential rib of predetermined radius and at least a second externally projecting circumferential rib of progressively smaller radius; and a lockring adapted to be forced longitudinally about the exterior of said outer sleeve and over said ribs, the interior radius of said lockring being less than the exterior radius of each said rib such that deformation of the material of said sleeve occurs at said ribs as said lockring is forced over said ribs, said first externally projecting rib positioned relative to said second externally projecting rib such that said lockring first encounters said first rib to produce a reverse taper deformation of said sleeve chamber.

12. An apparatus for making a connection between tube sections, the apparatus comprising a hollow sleeve having a first end and a second end, said ends being broadly symmetrical about a center portion, each said end having a hollow interior of a uniform radius, said radius only slightly larger than the exterior radius of the tube sections to be connected, and each said end having a reverse taper exterior whose radius broadly decreases from each said end toward said center portion; and at least one lockring means designed and constructed to be forced onto each said end of said sleeve and toward said center portion said sleeve, the interior radius of said lockrings being less than the greatest exterior radius of said sleeve ends such that as said lockrings are forced onto and along each said end, the material of the sleeve is forced to deform constrictively, said deformation being greatest near each said end of said sleeve at the area of the sleeve's greatest exterior radius and thereafter generally reducing toward said center portion to produce a reverse taper deformation of said sleeve interior and hence of the tube sections inserted therein.

13. A method of making a tube connection comprising inserting the ends of two separate sections of tube into a sleeve, which sleeve has a first end, a second end, a middle portion, a hollow interior of substantially uniform radius, intermediate each said end and middle portion and an irregular exterior, said exterior having a radius which reduces generally from each said end toward said center portion; and forcing a lockring having an inner radius less than said exterior radius on and about the exterior of said sleeve from each said end thereby deforming the material of said sleeve so that the hollow interior of said sleeve engages said tube sections such that deformation of said tube sections is greatest at said ends of said sleeve.

14. The invention of claims 1, 11 or 12 wherein said reverse taper deformation is approximately 3 degrees from the longitudinal axis of the sleeve.

* * * * *